Feb. 19, 1952          L. C. HUCK          2,586,336
APPARATUS FOR AND METHOD OF MAKING TUBULAR RIVET ELEMENTS
Filed May 1, 1948          2 SHEETS—SHEET 1
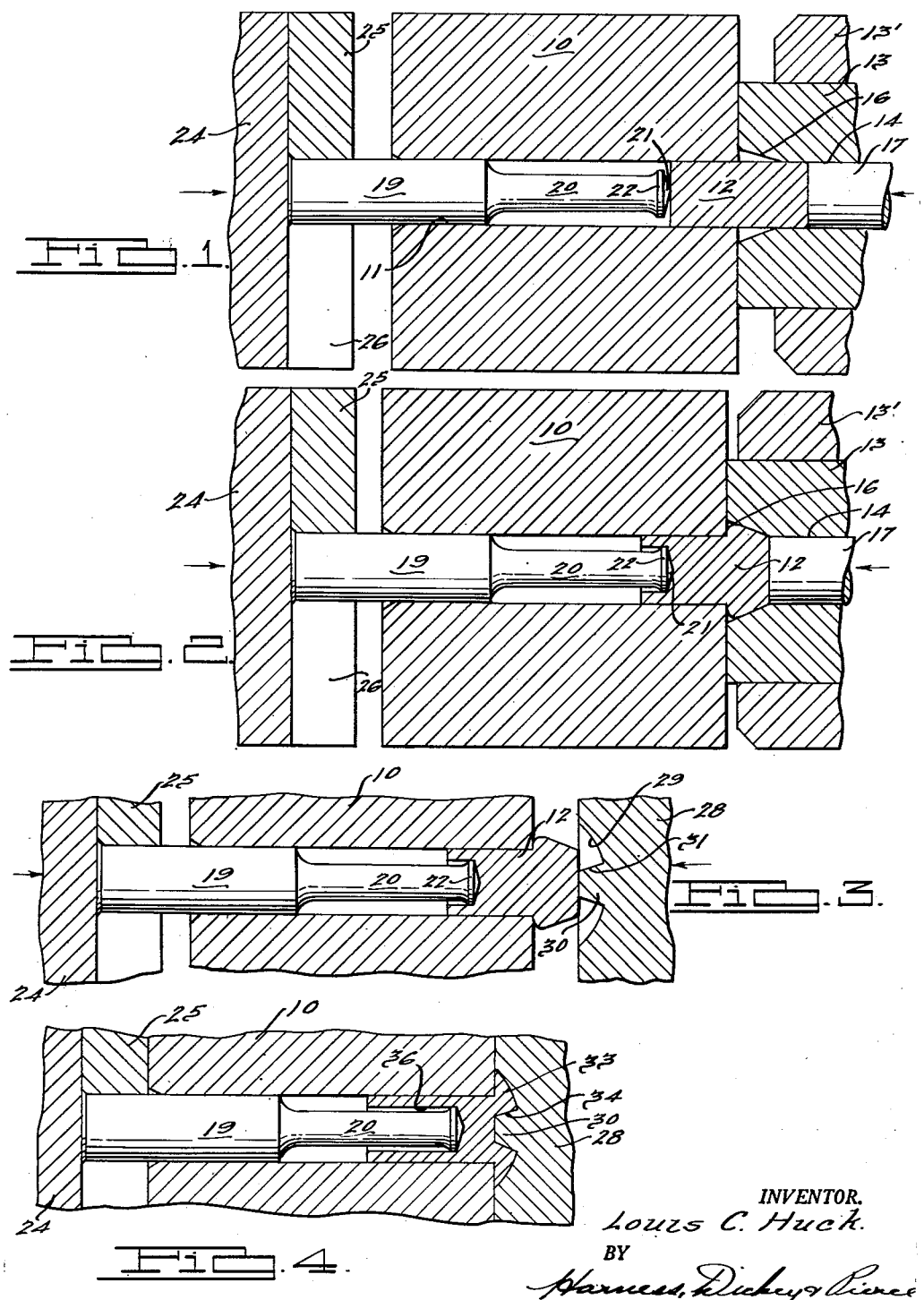
INVENTOR.
Louis C. Huck.
BY
Harness, Dickey & Pierce
ATTORNEYS.

Feb. 19, 1952        L. C. HUCK        2,586,336
APPARATUS FOR AND METHOD OF MAKING TUBULAR RIVET ELEMENTS
Filed May 1, 1948        2 SHEETS—SHEET 2
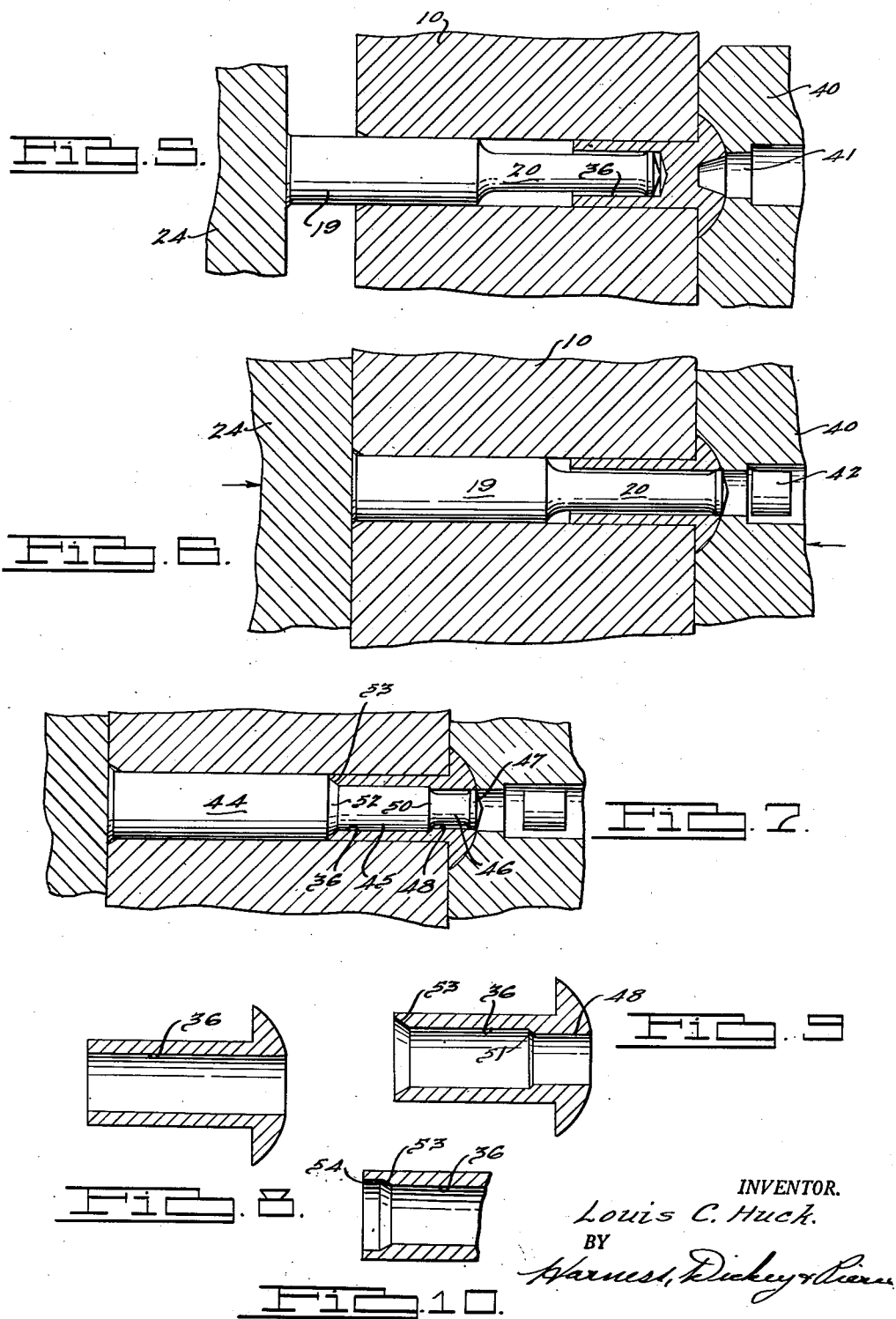
INVENTOR.
Louis C. Huck.
BY
ATTORNEYS.

Patented Feb. 19, 1952

2,586,336

UNITED STATES PATENT OFFICE 2,586,336

APPARATUS FOR AND METHOD OF MAKING TUBULAR RIVET ELEMENTS

Louis Charles Huck, Detroit, Mich., assignor to Huck Manufacturing Company, Detroit, Mich., a corporation of Michigan Application May 1, 1948, Serial No. 24,464

3 Claims. (Cl. 10—27)

The invention relates to rivets and it has particular relation to the manufacture of tubular elements.

In the manufacture of tubular rivets certain factors and obstacles have been encountered which heretofore generally governed fabrication of the rivet depending upon its size. In practically all instances the practice has been to form the central opening through the element by drilling, and only in the case of a very short rivet has it been possible even to consider punching the hole axially through the rivet. Drilling of the opening axially through the rivet element is, of course, a simple operation but it requires time and this is undesirable where rapid and volume production is important. Only a small number of rivets would be short enough in relation to the diameter as to render a punching operation practical in forming the rivet opening.

The present invention overcomes these obstacles by employing a combined piercing, or extruding, and punching operation by means of which enough of the element is extruded initially as to allow completion of the rivet hole through a punching operation. This enables manufacturing the element rapidly and in volume production on a machine designed to extrude and punch rapidly and economically.

In one illustrative form of the invention, the head is formed on the rivet element generally at the same time that the extruding operation occurs so that a headed type of tubular element may automatically be completed and produced in volume on a machine designed to effect the extruding, heading and punching operations.

One object of the invention, therefore, is to provide a method of manufacturing a tubular rivet element rapidly and economically from a wire or rod blank of such length that the opening through the rivet cannot be completely formed by a punching operation.

Another object of the invention is to provide a method of producing a rivet element wherein the opening in the element is formed by both piercing and punching operations.

Another object of the invention is to provide a method of producing tubular elements such as generally stated above, wherein a head on the tubular element is also formed in the fabricating operation.

Other objects of the invention will become apparent from the following specification, from the drawings relating thereto, and from the claims hereinafter set forth.

For a better understanding of the invention, reference may be had to the accompanying drawings, wherein:

Figure 1 is a cross-sectional view illustrating one form of apparatus which may be used in manufacturing tubular rivet elements in accordance with one form of the invention;

Fig. 2 is a view similar to Fig. 1 illustrating the first stage in the method of manufacture, wherein a head on the tubular element is partially formed;

Fig. 3 is a similar view showing use of a head forming die adapted to shape the head to its final form and to form a counterbore therein;

Fig. 4 is a view similar to Fig. 3 illustrating final forming of the head, and also the piercing operation;

Figs. 5 and 6 illustrate the manner in which the hole through the rivet element is completed by a punching operation;

Fig. 7 shows the manner in which a two-diameter opening in the rivet may be formed by a combination of piercing and punching operations;

Fig. 8 is a cross-sectional view showing a rivet element produced in accordance with the method disclosed in Figs. 1 to 6 inclusive;

Fig. 9 illustrates a rivet having a two-diameter opening produced in accordance with Fig. 7; and Fig. 10 is a partial view of a rivet similar to that shown in Fig. 9, with one end thereof having a modified form.

Referring to Figs. 1 and 2, the apparatus illustrated includes a block 10 having an opening 11 therethrough which is adapted to receive a blank 12 from which the tubular rivet element is to be formed. This blank may comprise a predetermined length of wire or metal rod and may consist of any suitable metal such, for example, as aluminum alloy. Initially the blank may be disposed at one end of the block 10, as seen in Fig. 1, and the first step in the method comprises partially forming a head on the projecting end of the blank. This is accomplished by means of a shroud 13 which is supported in holder 13' having an opening 14 therethrough corresponding substantially in size to the diameter of the blank and which terminates in a frusto-conical mouth 16 next to the block '0. A plunger 17 movable through the opening 14 is adapted to engage the end of the blank and upset the metal outwardly into the mouth 16.

The other end of the blank is engaged by a piercing tool 19 which is movable through the opening 11, and this tool has a smaller piercing portion 20 which terminates in a conical end face 21. Next to this conical face, the portion 20 has a short cylindrical land 22, and outwardly of this land the diameter of the portion is smaller so that beyond the land a frictional engagement between the tool and blank will be avoided during the piercing operation. The tool 19 is operatively connected to a base member 24 and between this member and the block 10 a removable spacer 25 is provided. This spacer is shown in the form of a disk having a slot 26 which allows it to be inserted over the tool.

In the initial operation, forces are applied to the member 24 and to the plunger 17 in opposing directions, as indicated by the arrows, and this causes initially an upsetting of the projecting end of the blank outwardly into the mouth 16, as seen in Fig. 2. At the same time, the end of the tool 19 enters the inner end of the blank, as seen also in Fig. 2. The extent of such movement is controlled by movement of the punch 17 and the shape of the opening 16. This entry of the tool 19 into the blank occurs as a result of extrusion of the metal inwardly over the tool, and as mentioned previously the smaller diameter of the piercing portion outwardly of the land 22 eliminates frictional engagement between the extruding metal and the tool except for the frictional engagement of the metal with the short land.

After the operation shown by Fig. 2 has occurred, the heading member 13 and plunger 17 are withdrawn and a second heading member 28 is brought into engagement with the partially upset end of the blank, as shown in Fig. 3. This second heading member has an annular cavity 29 of a shape to form a brazier type head, and centrally of this cavity the member has a projecting portion 30 which constitutes a short piercing tool for forming an opening in the head. This projection 30 has a frusto-conical side surface 31 with its smaller end next to the blank so as to both facilitate entry of the tool into the head and to cause outward upsetting of the metal in the head forming operation. When pressure now is exerted by the member 28 and the member 24, the end of the blank is upset to form a brazier head 33 having a central counterbore 34 equal substantially in depth to the depth of the head. Extrusion may take place while the head is forming and, after this head is thus formed, continued and, if necessary, increased forces applied against the members 24 and 28 may cause the piercing tool to move further into the blank and the latter to extrude over the tool so that an opening 36 is formed in the blank. The depth of the opening is controlled and limited by motion of the die 10 and may be varied by a spacer 25 engaging the block 10. The thickness of the spacer is such that the axial depth of the metal between the bottom of the opening 36 and the bottom of the counterbore 34 may be punched out by a punching operation subsequently described. In other words, the extrusion operation is carried out to such an extent that the metal still remaining to be removed before the hole is completed will have an axial dimension permitting it to be punched out of the blank in the form of a slug.

Referring now to Fig. 5, the heading member 28 has been withdrawn and a similarly shaped abutment member 40 is used in place thereof, but the latter member is open at its center as indicated at 41 so that the slug may be punched from the blank. Also, the spacer 25 has been removed so as to permit further movement of the piercing tool 19 which in the succeeding step will act as a punch. The final step is effected, as seen in Fig. 6, by applying the necessary forces to the member 24 and the member 40 so that the tool 19 will punch out the remaining metal in the form of a slug, indicated at 42 in Fig. 6. It is now only necessary to withdraw the members 24 and 40 and eject the tubular rivet element from the block 10. Figure 8 shows the completed rivet element.

In Fig. 7, instead of using the same piercing tool 19 in the final punching operation, a punch 44 is used which has a smaller portion 45 adapted substantially to fit the partial opening 36 formed in the extruding operation, and a relatively short punching end 46 adapted to punch out the remaining metal. The end of the punching portion, indicated at 47, is of slightly smaller diameter as compared to the portion 45 so that the punched portion of the hole will be smaller, as indicated at 48, and thus a two-diameter hole is provided. Back of the cylindrical land, at the end of the punching portion of the tool, the diameter is slightly reduced to minimize frictional engagement between the blank and the tool.

At the junction of the portions 45 and 46 of the tool, a shoulder 50 is formed so that at the junction of the two portions 36 and 48 of the opening a shoulder may be formed, as indicated at 51. The inner end of the portion 45 also joins a frusto-conical portion 52, and this portion in entering the end of the blank shapes it accordingly, as indicated at 53. This rivet, as seen particularly in Fig 9, therefore has the frusto-conical counterbore 53, the large diameter opening 36, and the smaller diameter opening 48, with a shoulder 51 between the two portions of the opening. The counterbore 53 provides a construction which resists splitting when the hollow sleeve is expanded in the driving operation. As shown in Fig. 10, by the use of a suitably shaped tool the rivet may be formed with a straight axial portion 54 at the end, which further strengthens the rivet against such splitting at the end.

In the practice of the invention, wire blanks are automatically cut from rolls of wire fed into the apparatus so that the openings may be effected rapidly and automatically and the elements produced inexpensively. The heading members 13 and 28 and the abutment member 40 all may be mounted so as to be indexed into position successively and in the same manner the necessary forces may be applied at the right times when the members are in position for the operations to be effected. A suitable ejecting member also may be used automatically after withdrawal of the punch so that the complete element may be ejected automatically. It will be appreciated, therefore, that the invention permits the use of rapidly producing apparatus so that the tubular rivet elements can be produced in volume.

Also, it will be appreciated that suitable ejection means may be provided and that the rivets or partially-formed blanks may be removed from one die and inserted in other dies for subsequent operations described. For the purpose of the present invention, such transfers may be performed by hand.

Although more than one form of the invention has been illustrated and described in detail, it will be apparent to those skilled in the art that various modifications may be made without departing from the scope of the appended claims.

What is claimed is:

1. The method of manufacturing a tubular rivet element out of a solid metal blank of round wire or rod stock, which comprises placing the blank in a substantially corresponding opening in a confining block but leaving one end portion of the blank projecting from the opening, upsetting said projecting end portion to form a head by a force applied in one direction, forcing an extruding and punching tool axially into the other end of the blank and into a substantial portion thereof to form an opening in the blank through backward extrusion of the metal over the tool by a force applied in an opposite direction to said one direction, and continuing the movement of said tool in said opposite direction through the blank beyond the inner end of the pierced opening so as to complete the opening by punching a slug from the remainder of the blank.

2. The method of manufacturing a tubular rivet element out of a solid metal blank of round wire or rod stock, which comprises placing the blank in a substantially corresponding opening in a confining block but leaving one end portion of the blank projecting from the opening, upsetting said projecting end portion to form a head, and simultaneously forming a central opening in the head by a force applied in one direction, forcing a piercing tool axially into the other end of the blank to form an opening in the latter through backward extrusion of the metal over the tool by a force applied in an opposite direction to said one direction, and then punching through that portion of the blank between the inner ends of the two openings so as to remove the metal in the form of a slug and complete an opening entirely through the blank by continuing movement of said tool in said opposite direction.

3. The method of manufacturing a tubular rivet element out of a solid metal blank of round wire or rod stock, which comprises placing the blank in a substantially corresponding opening in a confining block but leaving one end portion of the blank projecting from the opening, upsetting said projecting end portion to form a head, simultaneously forming a central opening in the head and which extends substantially through the axial length of the head by a force applied in one direction, forcing a piercing tool axially into the other end of the blank and into a substantial portion thereof, to form an opening in the latter through backward extrusion of the metal over the tool by a force applied in an opposite direction to said one direction, and then forcing a punch axially through the metal remaining between the two openings so as to complete the opening through the blank by a force applied in said opposite direction.

LOUIS CHARLES HUCK.

REFERENCES CITED

The following references are of record in the file of this patent:

UNITED STATES PATENTS

| Number | Name | Date |
| --- | --- | --- |
| 1,314,037 | Amberg | Aug. 26, 1919 |
| 2,182,922 | Heschel | Dec. 12, 1939 |
| 2,207,391 | Wilcox | July 9, 1940 |
| 2,287,214 | Wilcox | June 23, 1942 |
| 2,328,098 | Remington | Aug. 31, 1943 |
| 2,368,069 | Poole | Jan. 23, 1945 |
| 2,395,721 | Buchet | Feb. 26, 1946 |
| 2,395,722 | Buchet | Feb. 26, 1946 |
| 2,396,995 | Friedman | Mar. 19, 1946 |